Oct. 6, 1953
C. E. LESHER
2,654,699
METHOD OF DISCHARGING SOLIDS AND
GASES FROM A FLUIDIZED BED
Filed July 22, 1948
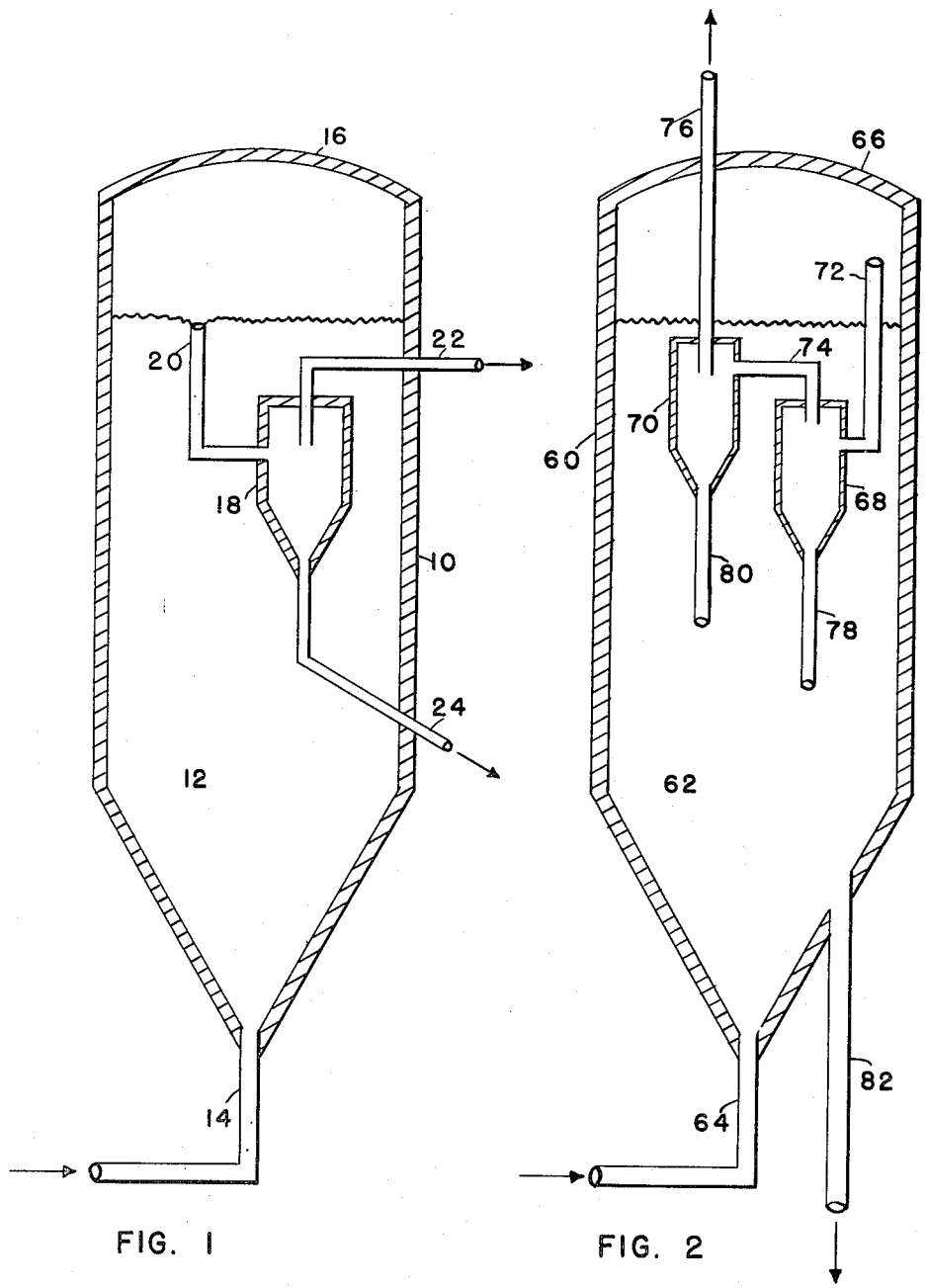
INVENTOR
C. E. LESHER
BY D. Leigh Fowler
ATTORNEY Patented Oct. 6, 1953

2,654,699

UNITED STATES PATENT OFFICE 2,654,699

METHOD OF DISCHARGING SOLIDS AND GASES FROM A FLUIDIZED BED

Carl E. Lesher, Ben Avon Heights, Pa., assignor to Pittsburgh Consolidation Coal Company, Pittsburgh, Pa., a corporation of Pennsylvania Application July 22, 1948, Serial No. 40,066

2 Claims. (Cl. 202—28)

This invention relates to methods and apparatus for treating gases and solids and, more particularly, to methods and apparatus for effecting separation of gases and solids.

In gas-solids contacting systems wherein gas (as used herein I include vapors within the meaning of the term "gas") is continuously withdrawn from a contacting zone, an appreciable amount of finely divided solids or dust is carried out of the contacting zone by the withdrawn or effluent gas. It is customary practice to provide a separator such as a cyclone above the contacting zone for separating the entrained dust from the gases. In those systems where the contacting zone is maintained at an elevated temperature, there frequently is sufficient temperature drop from the contacting zone to the separator to result in condensation of some, at least, of the effluent vapors or gases on the walls of the separator. The presence of liquid condensate promotes gradual deposition and accumulation of extremely fine particles of solid on the walls of the separator to the point where they obstruct the passage of gases through the separator. If the liquid condensate is carbonizable at the temperatures existing on the walls of the separator, then coking will take place with consequent additional accumulation of solids within the separator. Accordingly, it would be highly desirable if a separation zone could be provided which would operate under such conditions that no condensation of gases would take place and no adherent solid deposits would collect on the walls.

The primary object of this invention is to provide an improved method and apparatus for treating gases and solids.

Another object of the present invention is to provide an improved method and apparatus for effecting separation of gases and solids issuing from a contacting zone.

In accordance with my invention, the gases and solids coming from a contacting zone are separated in a separation zone which is disposed entirely beneath the level of the solids maintained in the contacting zone. The gases issuing from the contacting zone as well as the dust contained in these effluent gases are circulated down through the separation zone. Since the latter zone is surrounded by the contacting zone the two zones will be at substantially the same temperature with the result that little or no condensation of gases occurs in the separation zone. The separated gases are then withdrawn from the separation zone to suitable points of purification or collection.

In the preferred embodiment of my invention, not only the effluent gases and entrained dust pass through the separation zone but also any solid material in excess of that required to maintain the desired bed level in the contacting zone. This may be accomplished by arranging the inlet to the separation zone at the desired bed level and by extending the outlet of the separation zone to the exterior of the contacting zone. For efficient operation in this preferred embodiment the bed of solids should be in a fluidized state in order to permit ready overflow of solids into the separation zone. The circulation through the separation zone of these excess solids produces a scouring of the interior walls of the separation zone so that accumulation of fine dust is prevented.

For a better understanding of my invention, reference should be had to the following description and drawings in which:

Figure 1 is a diagrammatic illustration of a preferred embodiment of the apparatus of my invention;

Figure 2 is a diagrammatic illustration of a modification of the preferred apparatus shown in Figure 1.

Referring specifically to Figure 1 of the drawings, numeral 10 designates a stationary vertical vessel adapted to enclose a contacting zone 12. Conduit 14 communicates with the bottom of the vessel 10 for introducing solids and gases into the contacting zone. The top of the vessel 10 is closed by a wall 16. Disposed within the vessel 10 and entirely immersed in the contacting zone is a separator 18 which is preferably of the cyclone type. Communicating with the separator 18 is a conduit 20 which extends from the top of the separator to a point adjacent the top wall 16. A conduit 22 extends from the top of the separator 18 to the exterior of the vessel 10. A third conduit 24 communicates with the bottom of the separator 18 and likewise extends to the exterior of the vessel 10.

Referring to Figure 2 of the drawings, numeral 60 designates a vessel of the same type as disclosed in Figure 1 which is adapted to enclose a contacting zone 62. A conduit 64 communicates with the bottom of the vessel 60 for introducing gases and solids into the contacting zone. A wall 66 extends across the top of the vessel 60. Disposed within the vessel and immersed entirely in the contacting zone are two separators 68 and 70, preferably of the cyclone type. A conduit 72 communicates with the top of separator 68 and extends into the space between the top wall 66 and the level of solids in the contacting zone. A second conduit 74 extends from the top of the separator 68 to the top of separator 70 while a conduit 76 leads from the top of separator 70 to the exterior of the vessel 60. Conduits 78 and 80 are connected to the bottoms of separators 68 and 70, respectively, and open into the contacting zone 62 for discharging separated solids thereto. A discharge conduit 82 is also provided in the lower portion of vessel 60 for removing solids from the contacting zone.

For purposes of illustration only, the operation of apparatus shown in Figures 1, and 2 will be described in connection with carbonization of bituminous coal. However, it should be understood that not only is the apparatus and method herein described applicable to the treatment of coal generally, but also to any systems wherein it is desired to contact gases and solids and subsequently separate the gaseous and solid products. Referring to Figure 1, finely divided bituminous coal is introduced through conduit 14 into the contacting zone 12 along with steam. The velocity of the steam introduced into the contacting zone is regulated so that a fluidized bed of finely divided carbonaceous solids is maintained within the contacting zone 10. The conditions required to establish this fluid state are well known in the art and form no part of the present invention.

The temperature of the steam introduced into the contacting zone is such that an average temperature is established in the contacting zone within the carbonization range of 700° F. to 1400° F. The finely divided coal is carbonized or distilled at the temperature maintained within the contacting zone to yield a finely divided char or distillation residue and gaseous products including vapors of a tarry character.

Sufficient solids are maintained within the contacting zone to reach the top of conduit 20. Solids in excess of this amount along with the product vapors and steam, overflow through conduit 20 into the separator 18.

Since separator 18 is completely immersed in the contacting zone 12, the temperature maintained therein is substantially the same as that of the contacting zone. Consequently, little or no condensation of any of the gaseous products from the distillation of the coal takes place in the separator. These gaseous products are conducted from vessel 10 into conduit 22 to any suitable place of disposition. At the same time, the precipitated fines or dust, as well as any char overflowing from the fluid bed are carried off through conduit 24. The char which is substantially the same size as the coal introduced into the contacting zone serves to scour the walls of the separator 18. This scouring action prevents accumulation of dust on the walls of the separator. At the same time, the exterior walls of the separator are maintained in a clean condition by the scouring action of the finely divided coal mixtures surrounding the separator. It will thus be seen that the apparatus shown in Figure 1 provides for maintaining a constant level of fluidized solids in the contacting zone and at the same time provides for clean separation of gaseous and solid products without plugging of the separator.

The operation of the modified apparatus shown in Figure 2 as applied to the carbonization of finely divided coal differs from that of the apparatus of Figure 1 in that the level of the bed is maintained by discharging solids directly from the lower portion of the vessel rather than through the separators. The coal and heating gas such as steam are introduced into the vessel 60 through conduit 64. A fluidized bed of the coal and resulting carbonaceous distillation residue may be established in the well known manner to form the contacting zone 62. The level of the bed is maintained by withdrawing solids in regulated amounts through conduit 82. The effluent gases and entrained solid fines are conducted by conduit 72 to separator 68 and to separator 70 by conduit 74. The gases and solids are separated in these two separators in any suitable manner with the solids being returned to the contacting zone through conduits 78 and 80. The separated gases are withdrawn from the vessel through conduit 76 for purification, etc.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. Method of treating solids and gases which comprises circulating gases through a bed of finely divided carbonaceous solids under fluidizing conditions in a confined contacting zone which is maintained at carbonization temperature, conducting the effluent gases, including the tarry vaporous products, and entrained solids from said contacting zone through said bed in heat exchange relation therewith, separating the solids and gases while being conducted through said bed, and withdrawing said separated gases from said confined zone.

2. Method of treating solids and gases which comprises circulating gases through a bed of finely divided carbonaceous solids under fluidizing conditions in a confined contacting zone which is maintained at carbonization temperature, conducting the gases, including the tarry vaporous products of carbonization, escaping from the top of said bed and all solids above a predetermined level down through said bed out of direct contact with said bed but in heat exchange relation with said bed, separating the solids and gases while being so circulated through the bed, and withdrawing said separated solids and gases from said fluidized bed.

CARL E. LESHER.

References Cited in the file of this patent
UNITED STATES PATENTS

| Number | Name | Date |
|---|---|---|
| 2,304,128 | Thomas | Dec. 8, 1942 |
| 2,327,175 | Conn | Aug. 17, 1943 |
| 2,367,281 | Johnson | Jan. 16, 1945 |
| 2,379,448 | Linn | July 3, 1945 |
| 2,414,586 | Egloff | Jan. 21, 1947 |
| 2,429,751 | Gohr | Oct. 28, 1947 |
| 2,432,298 | Eastwood et al. | Dec. 9, 1947 |